US012221072B2

(12) United States Patent
Moore et al.

(10) Patent No.: US 12,221,072 B2
(45) Date of Patent: Feb. 11, 2025

(54) METHOD OF FABRICATING A BACKPACK TRUCK BOX

(71) Applicant: Buyers Products Company, Mentor, OH (US)

(72) Inventors: Tyler Moore, Mentor, OH (US); Joe Mossbarger, Mentor, OH (US)

(73) Assignee: BUYERS PRODUCTS COMPANY, Mentor, OH (US)

( * ) Notice: Subject to any disclaimer, the term of this patent is extended or adjusted under 35 U.S.C. 154(b) by 32 days.

(21) Appl. No.: 18/332,257

(22) Filed: Jul. 6, 2023

(65) Prior Publication Data

US 2025/0010803 A1 Jan. 9, 2025

(51) Int. Cl.

| | |
|---|---|
| ***B23K 9/00*** | (2006.01) |
| ***B60R 9/06*** | (2006.01) |
| ***B62D 33/04*** | (2006.01) |
| *B23K 101/04* | (2006.01) |

(52) U.S. Cl.

CPC ............ *B60R 9/065* (2013.01); *B62D 33/044* (2013.01); *B23K 2101/04* (2018.08)

(58) Field of Classification Search

CPC .............................. B60R 9/065; B62D 33/044

USPC ...................... 228/173.1–173.4, 173.6–173.7

See application file for complete search history.

(56) References Cited

U.S. PATENT DOCUMENTS 3,684,112 A * 8/1972 Wijers .................. B60P 1/6427 414/500

2005/0040197 A1 * 2/2005 Botha ..................... B60R 9/065 224/427

FOREIGN PATENT DOCUMENTS

CN 2266560 Y * 11/1997
CN 2295579 Y * 10/1998
CN 2330464 Y * 7/1999
CN 201002756 Y * 1/2008
CN 203142551 U * 8/2013
CN 203566677 U * 4/2014
CN 204432498 U * 7/2015
CN 105416146 A * 3/2016
CN 205075757 U * 3/2016
CN 207696499 U * 8/2018
CN 209972289 U * 1/2020
CN 210454590 U * 5/2020 ................ B60P 3/14
CN 212267631 U * 1/2021
CN 212448505 U * 2/2021
CN 212825278 U * 3/2021
CN 213799391 U * 7/2021
CN 215076719 U * 12/2021
CN 216000461 U * 3/2022
CN 116714503 A * 9/2023

(Continued)

*Primary Examiner* — Kiley S Stoner

(74) *Attorney, Agent, or Firm* — Emerson, Thomson & Bennett, LLC; Roger D. Emerson

(57) ABSTRACT

Provided in this disclosure is a method of fabricating a backpack truck box, including a step of forming first and second patterned members from sheet material. Each of the patterned members includes multiple edges defining a first panel and a second panel each with one or more opposing tabs formed contiguously on opposing edges of each of panels. One or more bending operations are performed upon each of the opposing tabs to form first and second side portions extending at a predetermined angle from each of the panels. The side portions of the first panel are welded to respective corresponding side portions of the second panel to produce a welded backpack truck box housing.

11 Claims, 18 Drawing Sheets

(56) References Cited

FOREIGN PATENT DOCUMENTS

| | | | | | |
|---|---|---|---|---|---|
| CN | 219666607 | U | * | 9/2023 | |
| CN | 220466116 | U | * | 2/2024 | |
| DE | 202004017604 | U1 | * | 2/2005 | ............ B60R 9/055 |
| KR | 20160148184 | A | * | 12/2016 | |

* cited by examiner

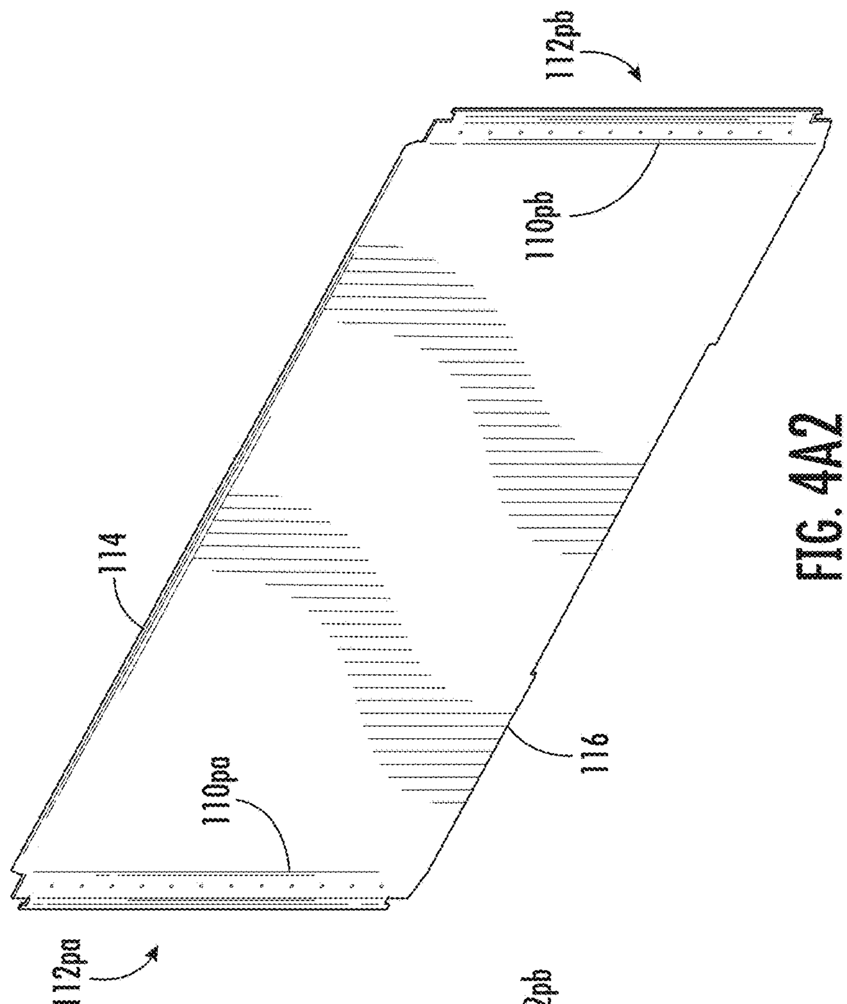
FIG. 4A2
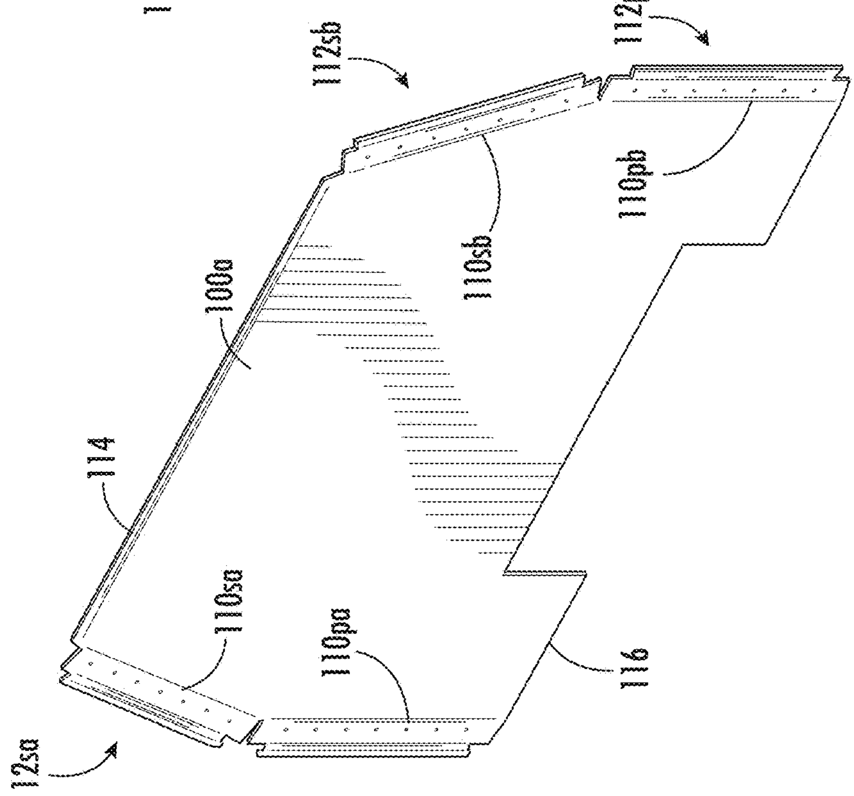
FIG. 4A1

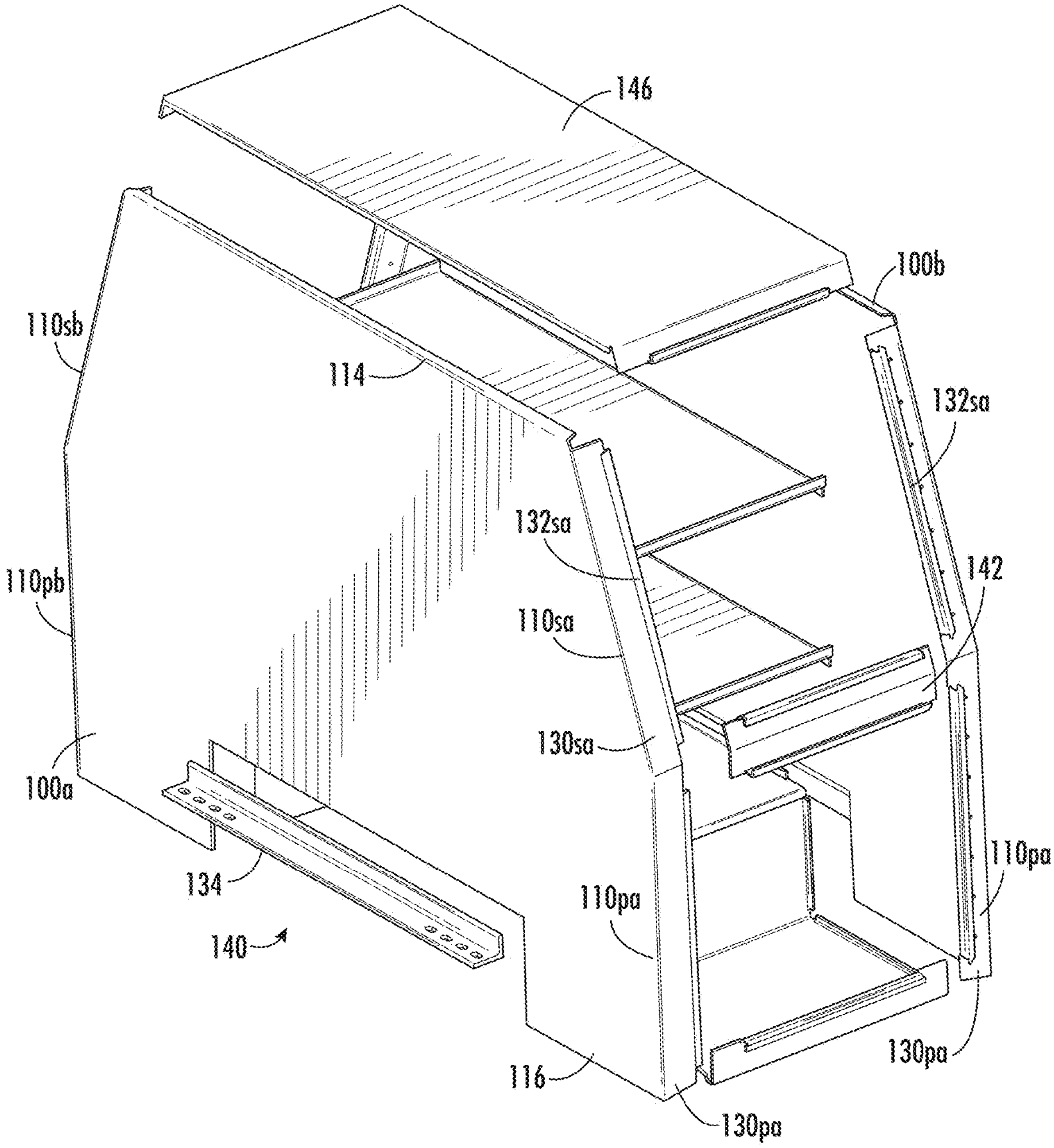
FIG. 4B1

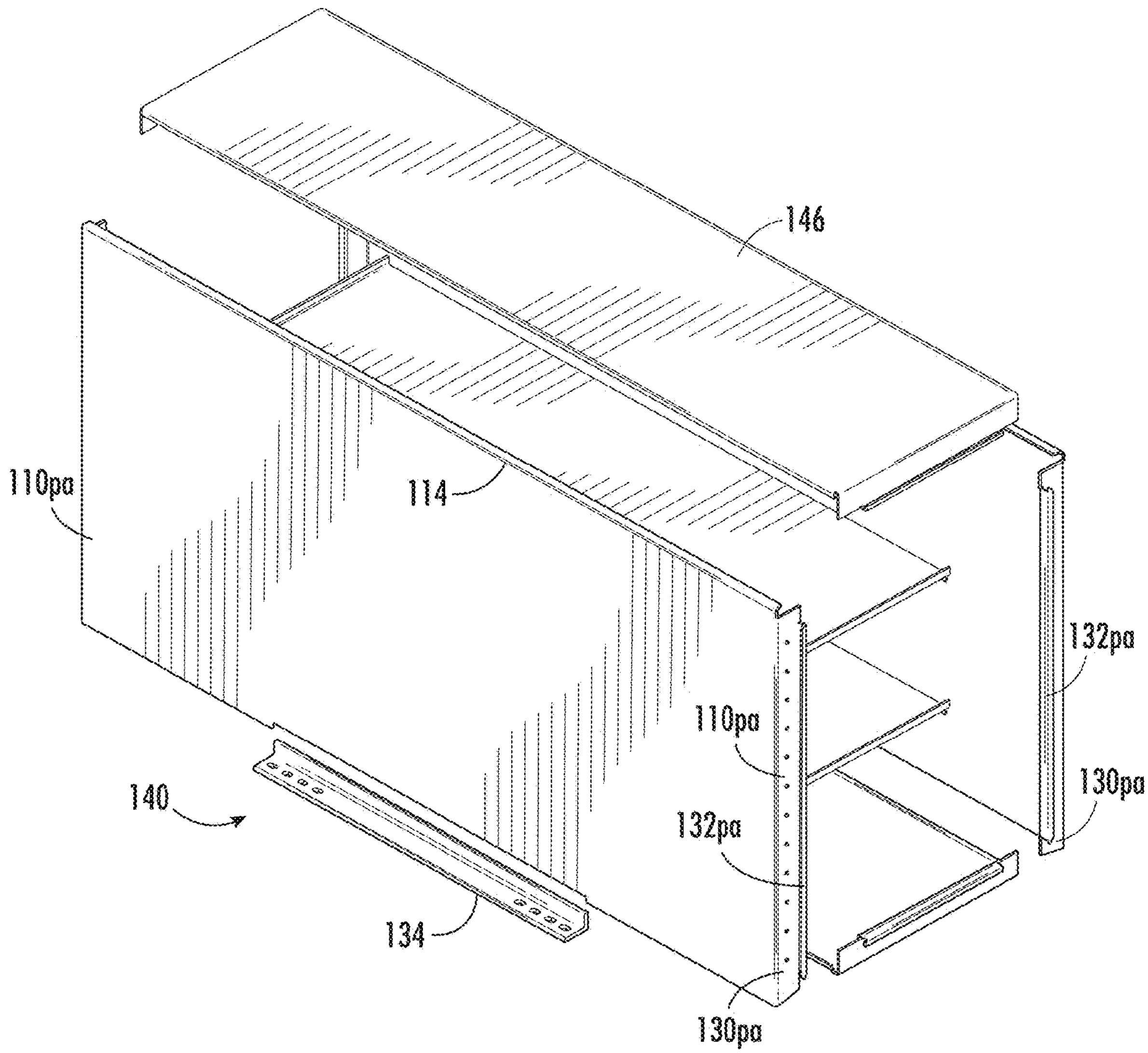
FIG. 4B2

METHOD OF FABRICATING A BACKPACK TRUCK BOX

I. BACKGROUND

A. Technical Field

This invention pertains generally to the field of metal fabricating, particularly of metal boxes. This invention pertains particularly to the field of fabricating backpack boxes used for work vehicles, which are commonly used for retaining tools and materials employed at work sites.

B. Description of Related Art

Backpack truck boxes are commonly known for use with work vehicles such as pickup trucks, stake body trucks, dump trucks the like. As shown in FIG. 1A, such backpack truck boxes 10 are commonly mounted onto the chassis of the vehicle 12 and located behind the cab 14, and are used to store tools, materials and any other suitable articles that might be useful at a work site. In this manner, such backpack truck boxes 10 are located to be readily accessible to work personnel upon exiting the vehicle cab 14.

In one embodiment shown in FIGS. 1B, 1C and 2, a typical backpack truck box 10 can have a shape which can be geometrically described as a "semi-truncated rectangular prism." Such a figure is a type of rectangular solid shape having two vertical corners cut off (or truncated). The resulting shape is defined by front and back panels 20, two opposing parallel sides 22, and two opposing sloped sides 24. The parallel sides 22 and sloped sides 24 are configured to receive respective doors 22*a*, 24*a* that allow access to the interior compartments of the truck box 10. However, it is to be appreciated that that a backpack truck box 10 can alternatively be in the shape of a regular rectangular box without truncated vertical corners.

As shown particularly in FIG. 2, a truck box 10 is typically formed of the front and back panels 20 each having the two-dimensional shape of a semi-truncated rectangle. The parallel sides 22 and the sloped sides 24 are each typically formed of a single side panel 30, having an angled bend to correspond to the angle of the opposing sloped sides 24. The front and back panels 20 are welded to the side panels 30. Welds are formed between respective parallel corner posts 32*a* of the side panels 30 and parallel corner posts 32*b* of the front and back panels 20. Welds are also formed between respective sloped corner posts 34*a* of the side panels 30 and sloped corner posts 34*b* of the front and back panels 20. This assembly generally defines a backpack truck box housing. A top portion 40 is welded onto the top of backpack truck box housing and optional shelves can be installed or welded within the interior of the housing to complete the backpack truck box 10.

The typical construction of the backpack truck box 10 as described hereinabove requires a great deal of welding. This is resource-intensive and requiring a large number of work hours in order to construct a truck box 10. This adds considerably to the complexity and expense of manufacture, resulting in higher product cost for the end user. Moreover, additional operational costs are encountered in other manufacturing steps.

As shown in FIG. 3, both the parallel and sloped sides 22, 24 of the side panels 30 include a corner post 42 surrounding an internal perimeter for openings that provide access into the internal volume of the box 10. These corner posts 42 provide structural reinforcement and mounting surfaces for the doors 22*a*, 24*a*. The corner posts 42 are formed by deforming a portion of the metal of the side panels 30 interior to the openings, which is a very labor-intensive process. While the corner posts 42 provide some mechanical strength, the resulting structure remains weak and gussets 44 must be welded into the corners of the openings to provide adequate mechanical strength to the truck box 10, resulting in additional material and labor costs.

II. Summary

Provided in this disclosure is a method of fabricating a backpack truck box, including a step of forming first and second patterned members from sheet material. Each of the patterned members are formed by a plurality of edges defining a first panel and a second panel, each of which have one or more pairs of opposing tabs formed contiguously on opposing edges of each of the first and second panels. One or more bending operations are performed upon each of the opposing tabs to form first and second side portions extending at a predetermined angle from each of the first and second panels. The side portions of the first panel are welded together to respective corresponding side portions of the second panel to produce a welded backpack truck box housing.

In an exemplary embodiment, the forming of the first and second patterned members includes forming each panel into a two-dimensional shape of a semi-truncated rectangle with at least a pair of rectangular opposing tabs. This results in a backpack truck box housing having a three-dimensional shape of a semi-truncated rectangular prism. The plurality of edges of each panel can include first and second opposing parallel edges and first and second opposing sloped edges. The rectangular opposing tabs can be tabs formed respectively on each of the respective opposing parallel and sloped edges. The step of performing the bending operation(s) can include forming side portions along each of the first and second opposing parallel edges and first and second opposing sloped edges.

In another exemplary embodiment, the performing of the bending operation(s) can include performing a plurality of bending operations upon each of the opposing tabs to form perpendicular side portions each having perpendicularly-extending rectangular gutters. These gutters each define a partial perimeter into an internal volume of the backpack truck box housing. Preferably, doors can be attached to the respective partial perimeters for enclosing the internal volume of the backpack truck box housing. Further, the step of welding can include welding a middle portion between the side panels to define a width of the backpack truck box housing. Additionally, a top portion can be welded onto the backpack truck box housing. Moreover, one or more shelves can be assembled within the backpack truck box housing. Alternatively, no shelves can be used, and adjustable shelves can be used. Any shelves can be welded in place.

Another exemplary embodiment of the present method of fabricating a backpack truck box can include forming first and second patterned members from sheet material. Each of the patterned members include first and second opposing parallel edges and first and second opposing sloped edges thereby defining a first panel and a second panel each having a two-dimensional shape of a semi-truncated rectangle. The patterned members include rectangular tabs formed respectively contiguously on the respective opposing parallel and sloped edges of each of the first and second panels. One or more bending operations are performed upon each of the rectangular tabs to form parallel and sloped side portions. These side portions extend perpendicularly from each of the first and second panels respectively along each of the first and second opposing parallel and sloped edges. A middle portion is welded between the parallel and sloped side portions of the first panel to respective parallel and sloped side portions of the second panel to produce a welded backpack truck box housing. A top portion is welded onto the backpack truck box housing.

In another exemplary embodiment, the performing of the bending operation(s) includes performing a plurality of bending operations upon each of the opposing tabs to form perpendicular side portions each having perpendicularly-extending rectangular gutters that each define a partial perimeter into an internal volume of the backpack truck box housing. A door is attached to one or more partial perimeters for enclosing the internal volume of the backpack truck box housing.

According to one aspect, the method of the invention considerably reduces the amount of welding required to manufacture a backpack truck box.

According to another aspect, the method of the invention is less resource-intensive and reduces the number of work hours and resources required to construct a truck box.

According to still another aspect, the method of the invention reduces the complexity and expense of needed for manufacturing a truck box, resulting in a reduction in product cost that can be passed along to the end user.

According to yet another aspect, the method of the invention reduces the labor required for producing corner posts for mounting doors to the truck box.

According to a further aspect, the method of the invention eliminates welded gussets, thereby reducing material and labor costs and providing rims having superior mechanical strength.

Other benefits and advantages of this invention will become apparent to those skilled in the art to which it pertains upon reading and understanding of the following detailed specification.

III. Brief Description of the Drawings

The disclosed method may take physical form in certain parts and arrangement of parts, and manufacturing steps, the embodiments of which will be described in detail in this specification and illustrated in the accompanying drawings which form a part hereof and wherein:

FIGS. 1A, 1B, and IC are respectively deployment, perspective and side views of a known type of backpack truck box.

FIGS. 4A1, 4A2, 4B1 and 4B2 are perspective views of two embodiments of patterned members and exploded views of backpack truck boxes formed in accordance with the method of the present invention.

Figure 5B:
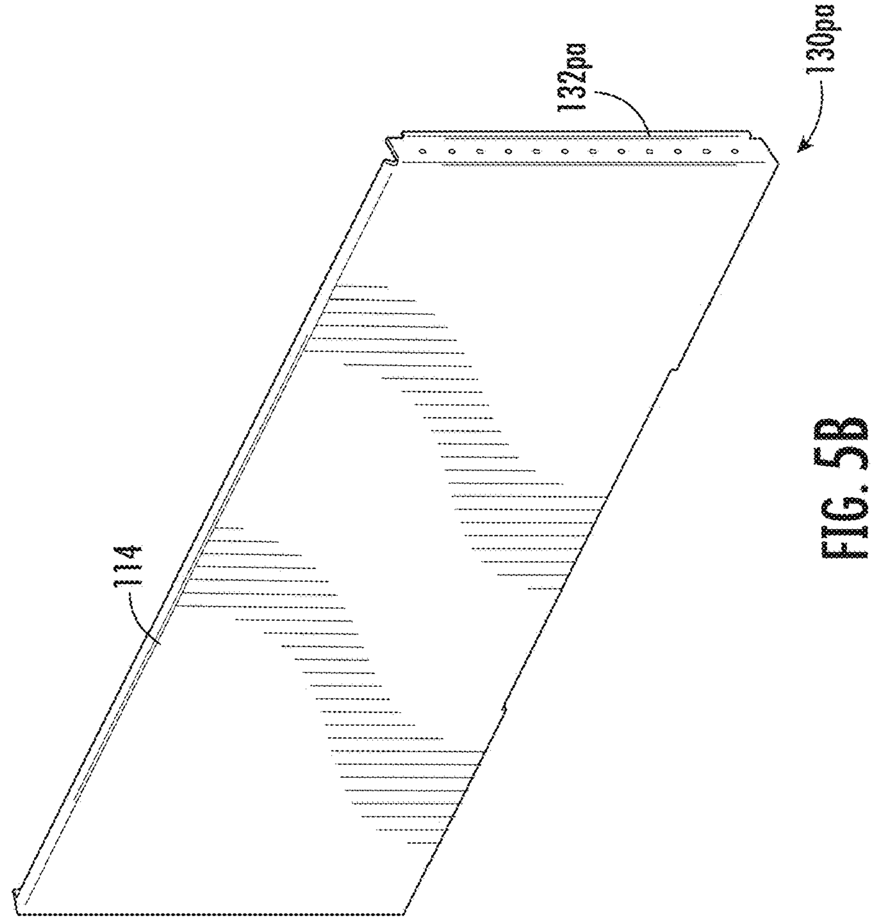
Figure 5A:
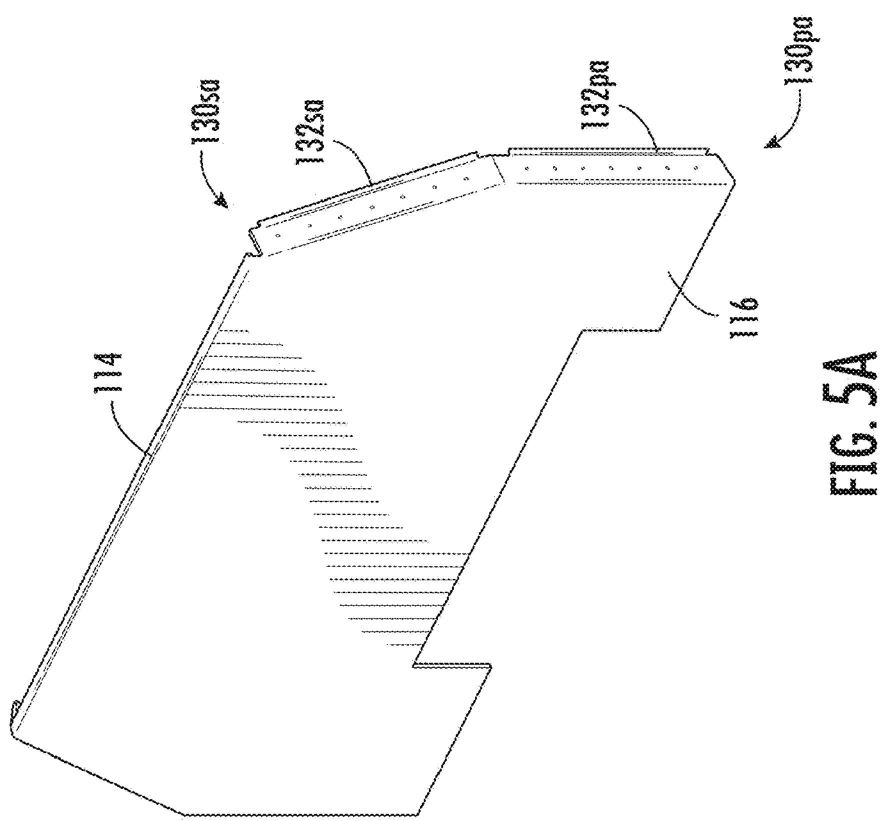

FIGS. 5A and 5B are perspective views of two embodiments of panels used in the fabrication of backpack truck boxes formed in accordance with the method of the present invention.

Figure 6A:
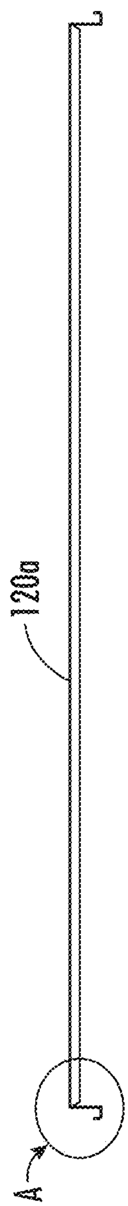
Figure 6B:
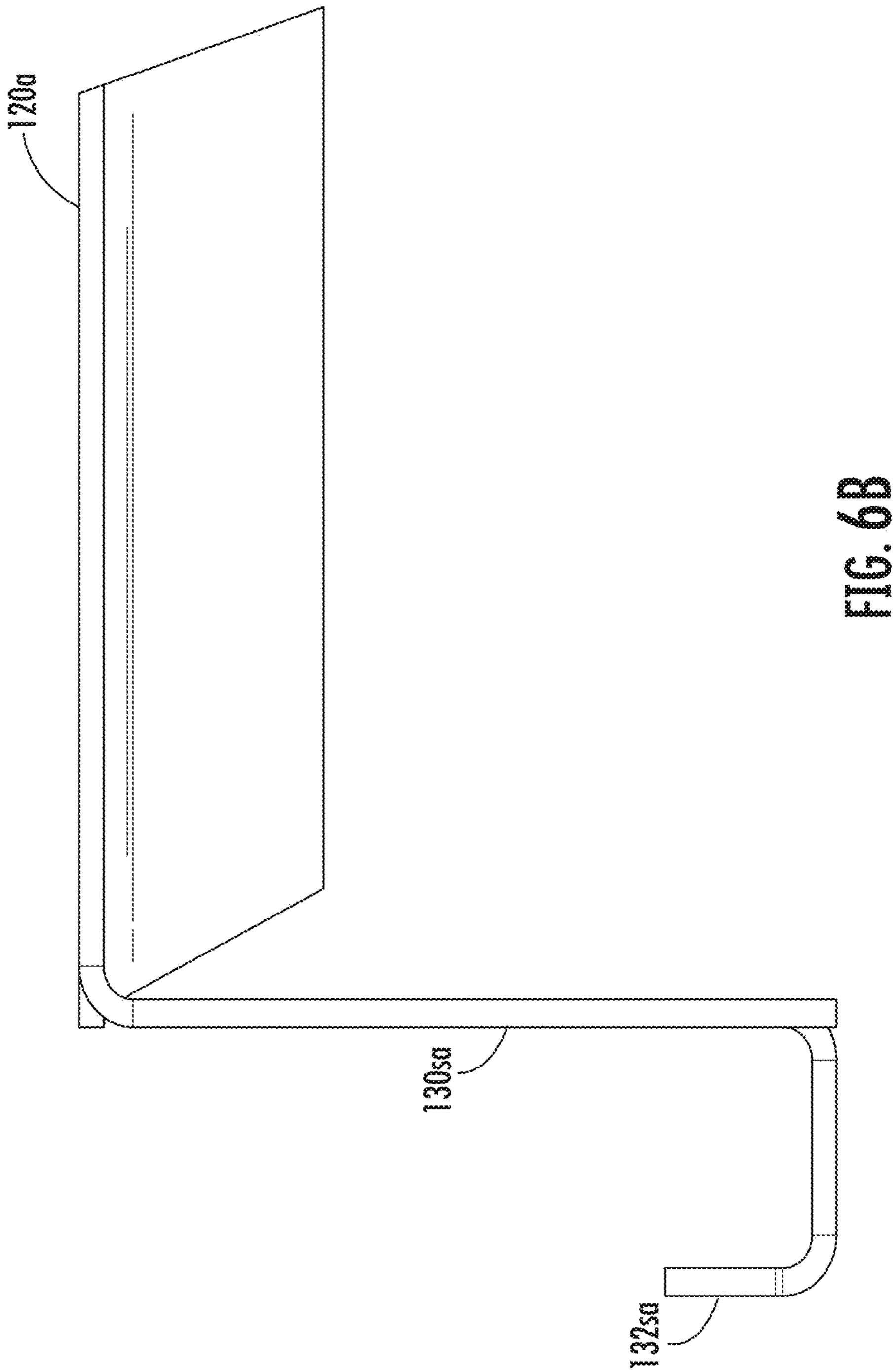

FIGS. 6A and 6B are respective overhead and detail views of the panels of FIGS. 5A and 5B showing the gutter formed by the fabrication of backpack truck boxes in accordance with the method of the present invention.

Figure 7:
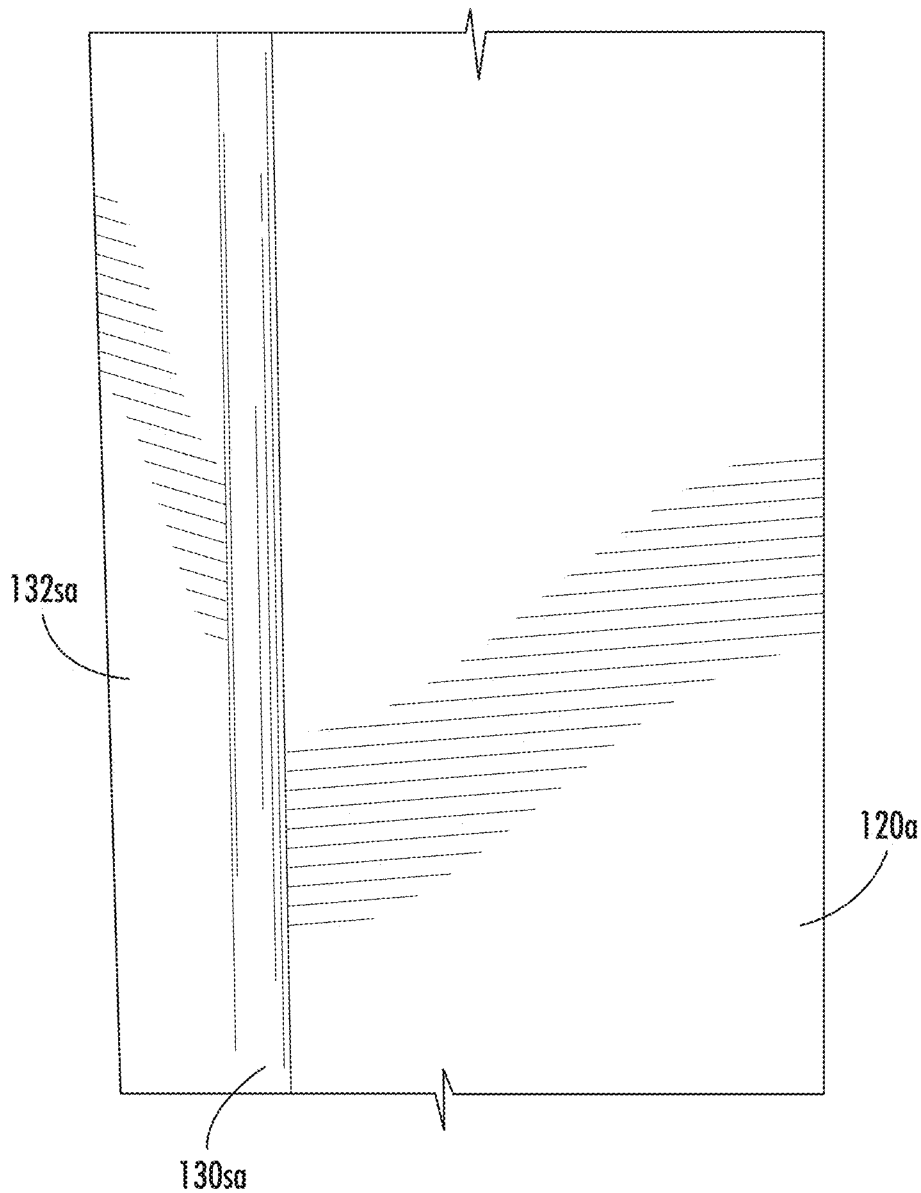

FIG. 7 is a zoomed-in side view of the panel of FIGS. 5 and 6 showing the gutter formed by the fabrication of a backpack truck box in accordance with the method of the present invention.

Figure 8:
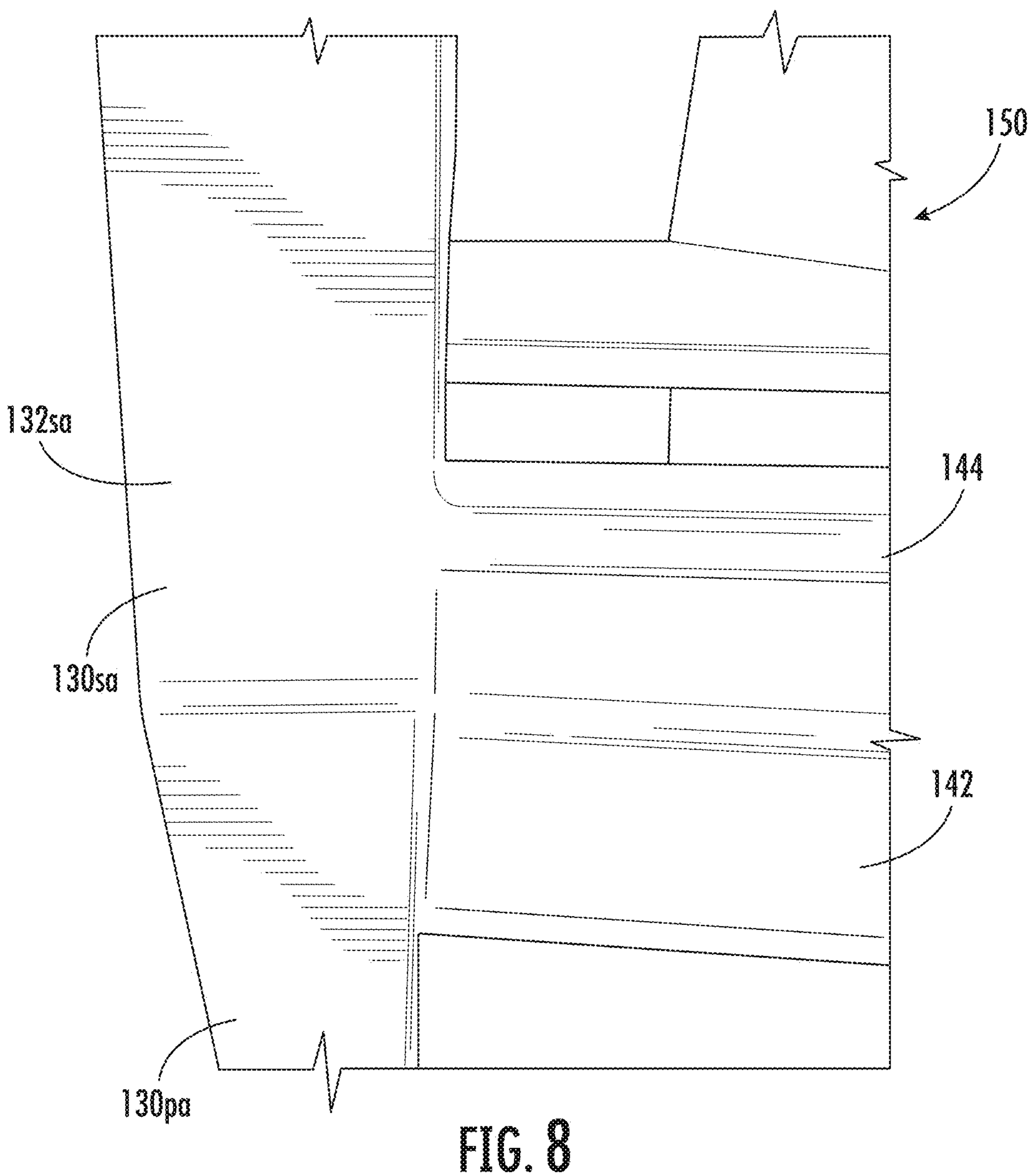
Figure 9A:
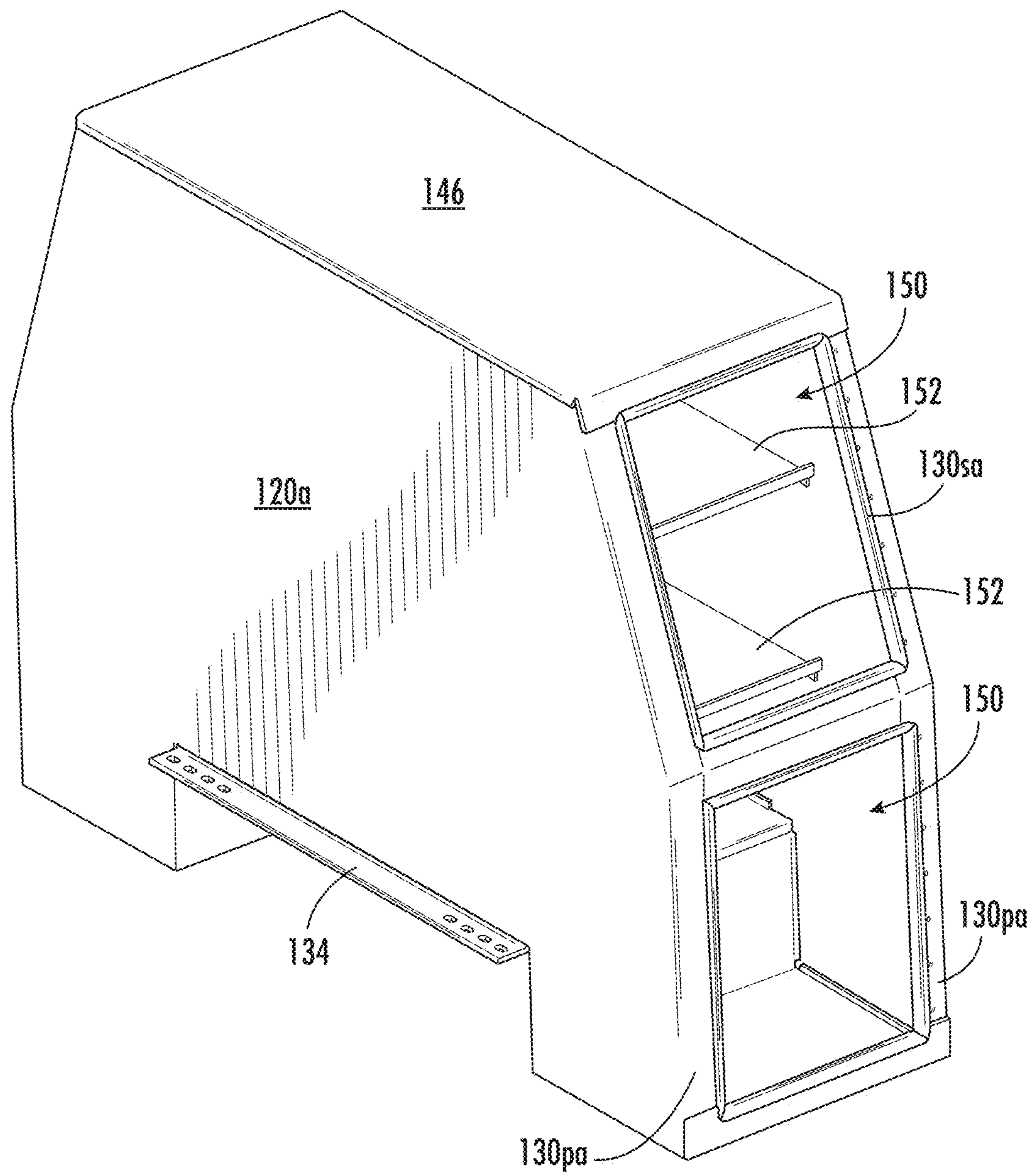
Figure 9F:
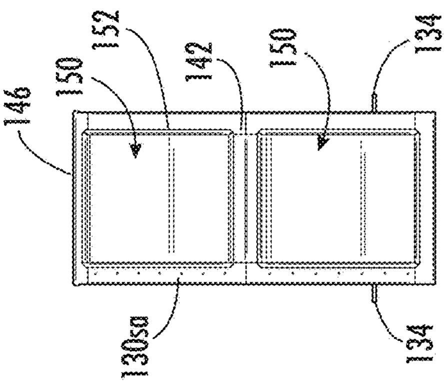
Figure 9B:
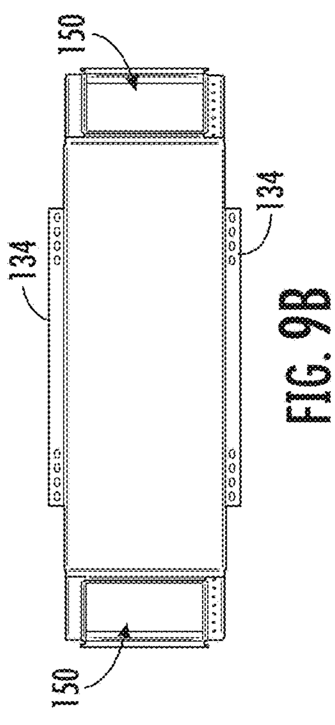
Figure 9C:
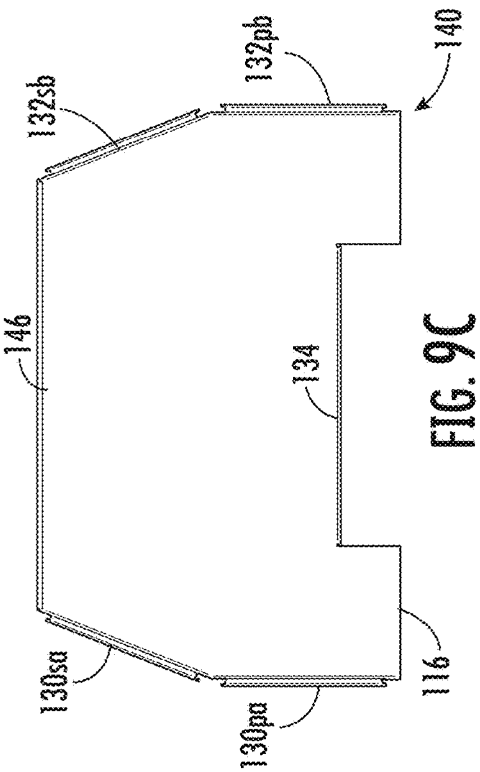
Figure 9D:
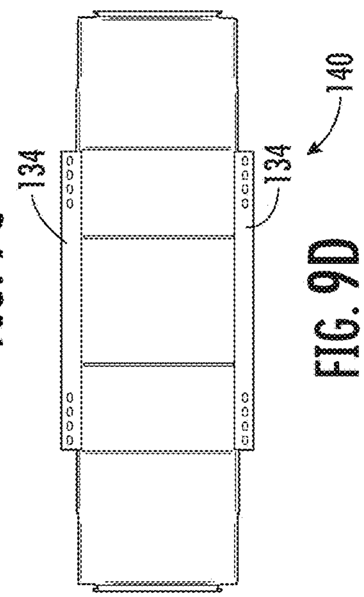
Figure 9E:
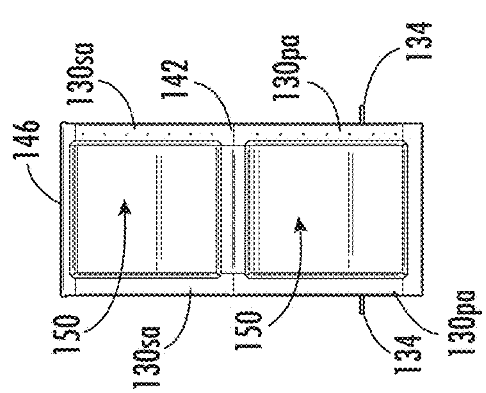

FIG. 8 is a zoomed-in view depicting the attachment of the middle portion to the parallel and sloped side portions of the panel of FIG. 5 in the fabrication of a backpack truck box in accordance with the method of the present invention.

FIGS. 9A, 9B, 9C, 9D, 9E and 9F are respectively perspective, top, bottom, and side views of an embodiment if the backpack truck box having truncated corners formed in accordance with the method of the present invention.

Figure 10A:
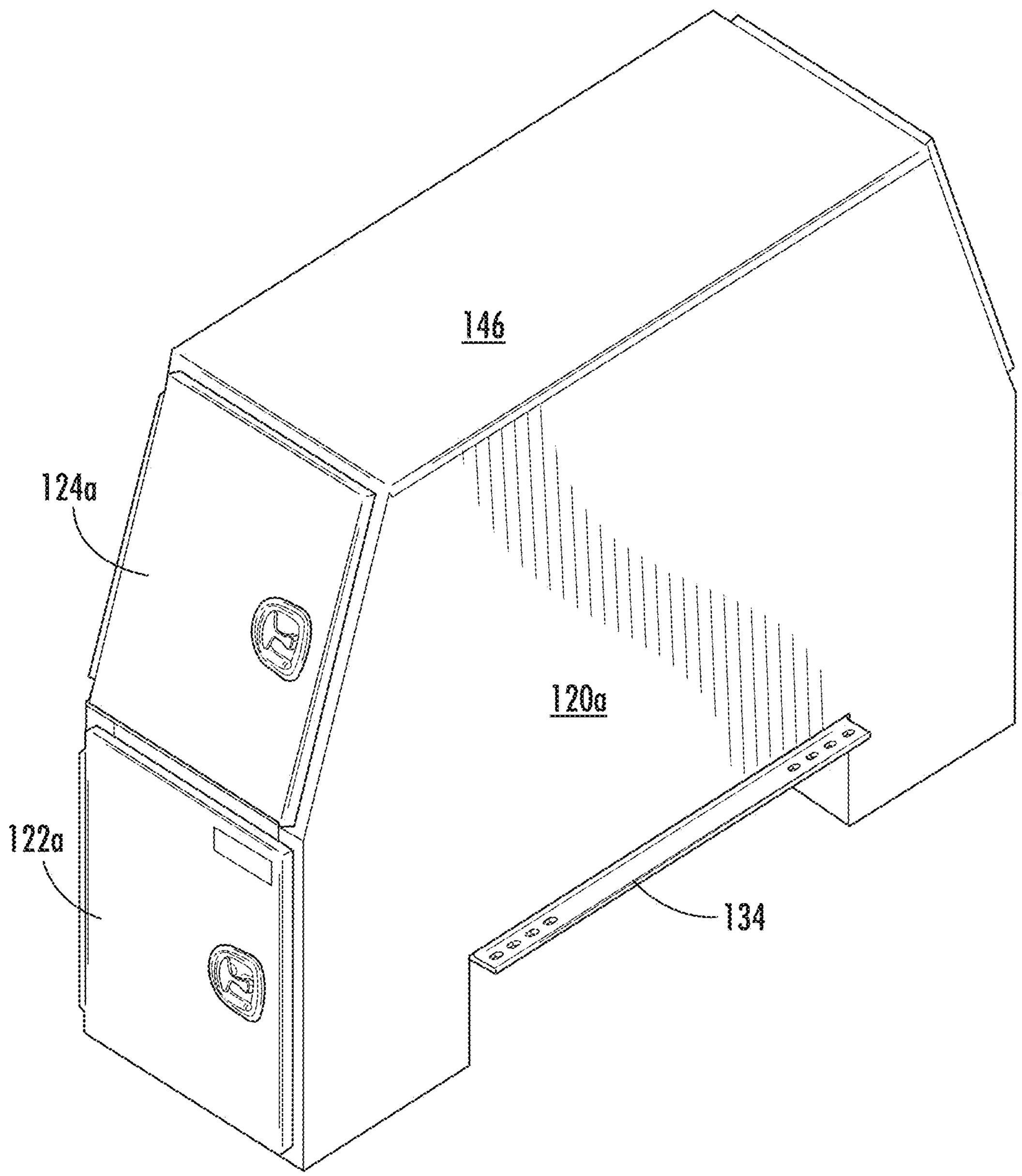
Figure 10B:
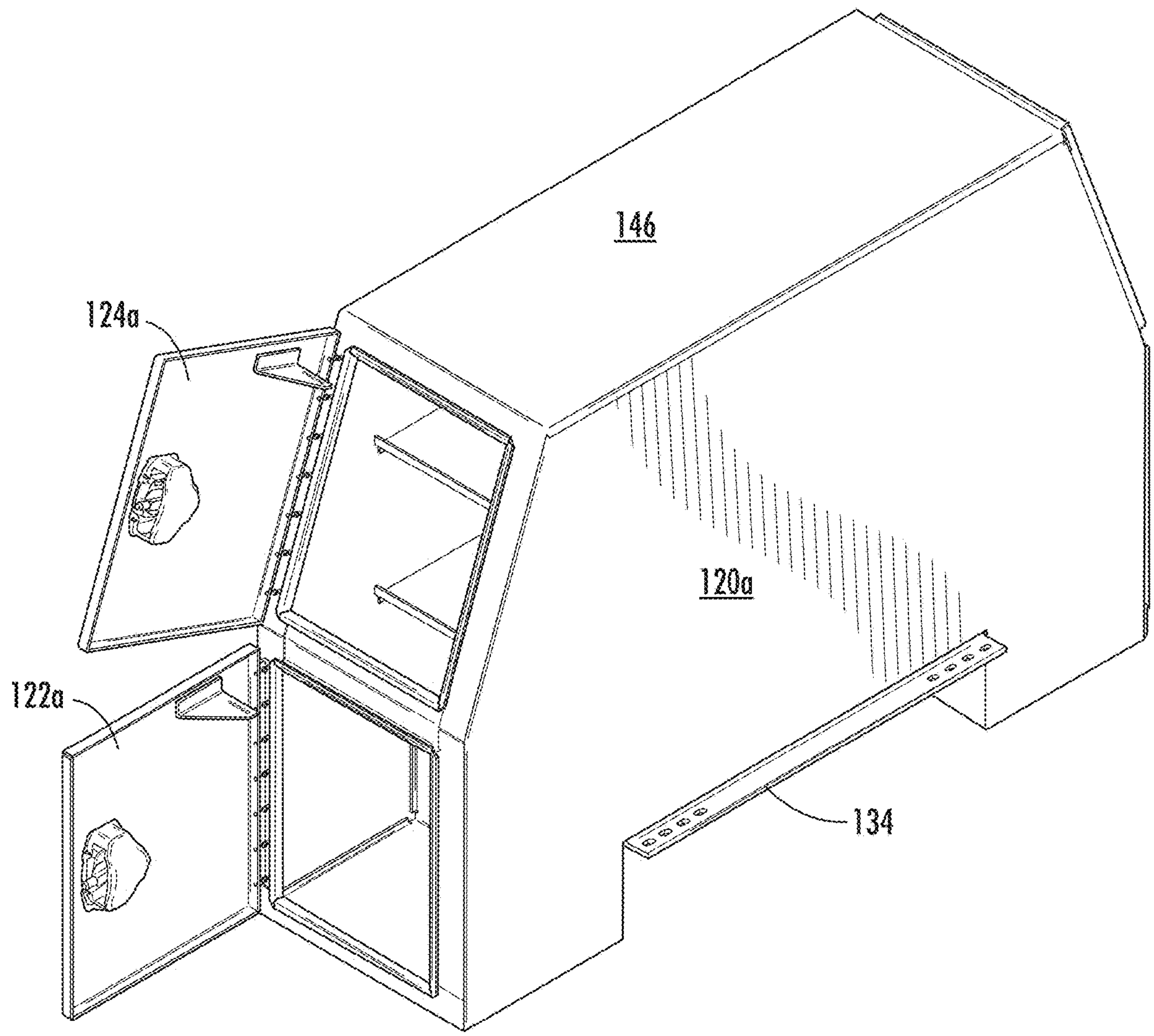
Figure 11A:
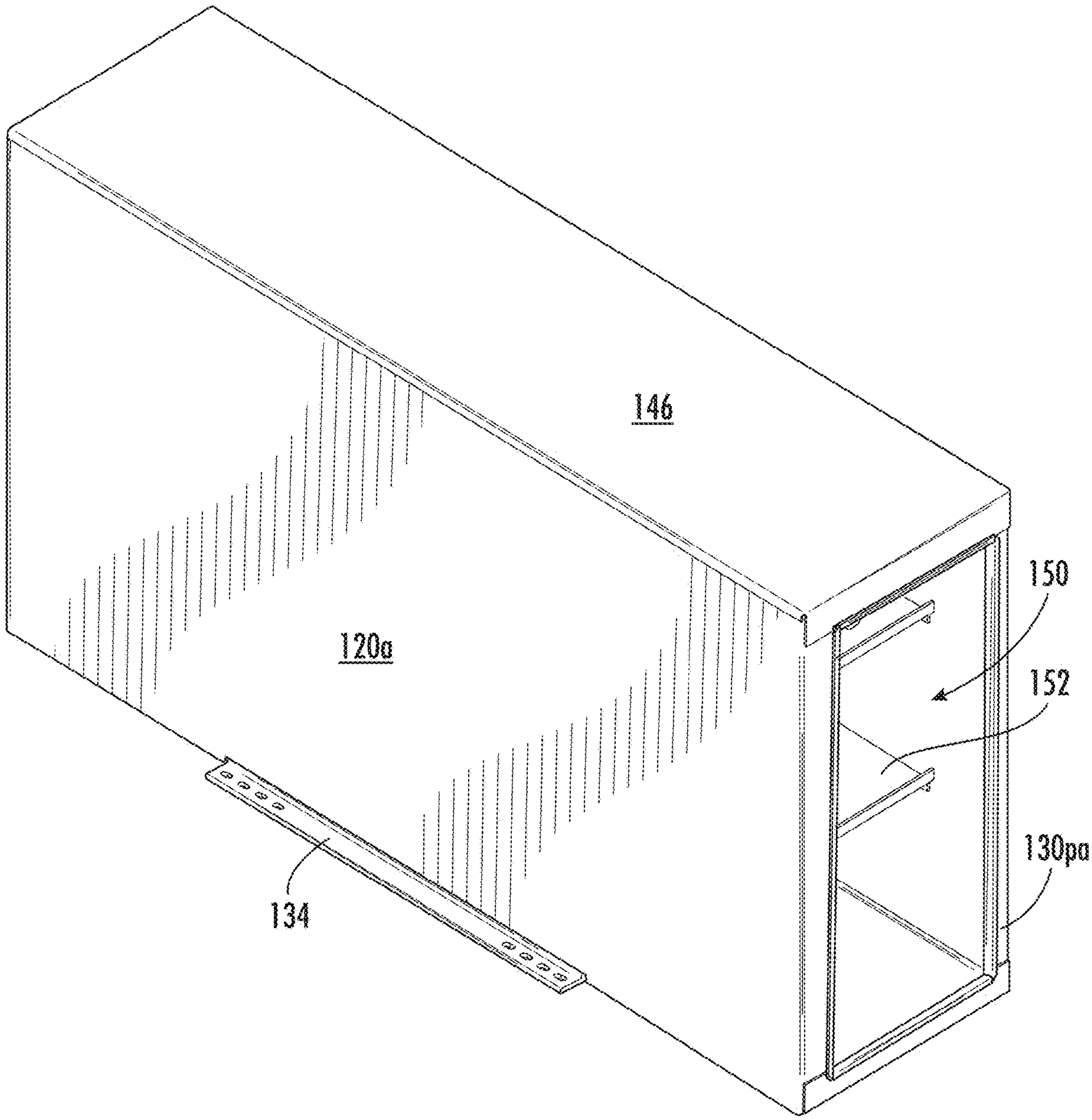
Figure 11F:
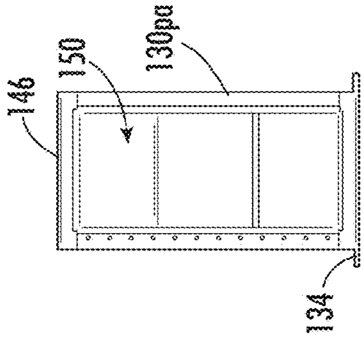
Figure 11B:
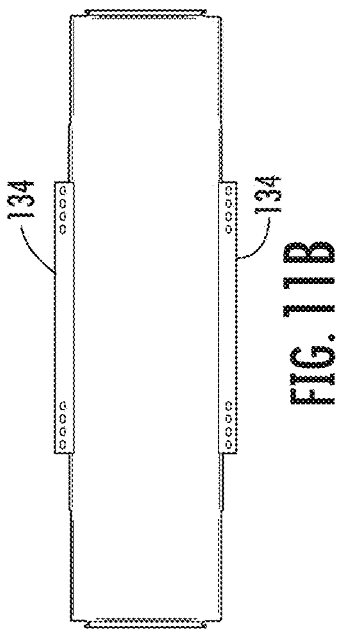
Figure 11C:
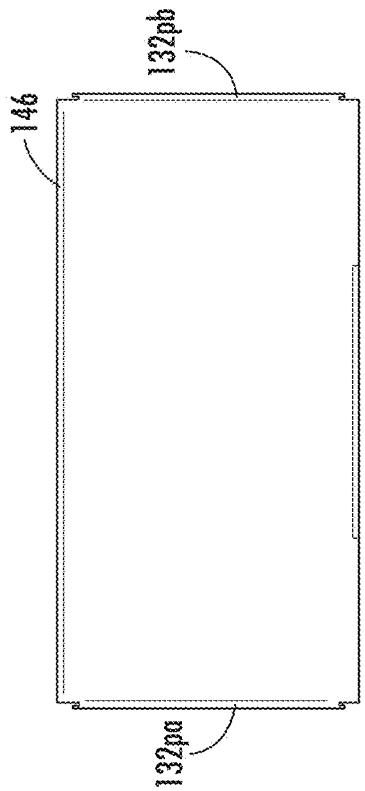
Figure 11D:
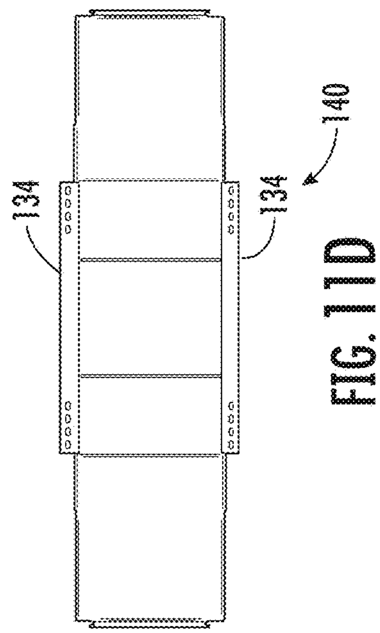
Figure 11E:
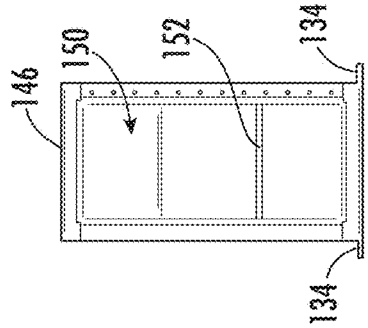

FIGS. 10A and 10B are perspective views showing the embodiment of the backpack truck box having truncated corners respectively with doors closed and open in accordance with the method of the present invention.

FIGS. 11A, 11B, 11C, 11D, 11E and 11F are respectively perspective, top, bottom, and side views of an embodiment if the backpack truck box having a rectangular shape formed in accordance with the method of the present invention.

Figure 12A:
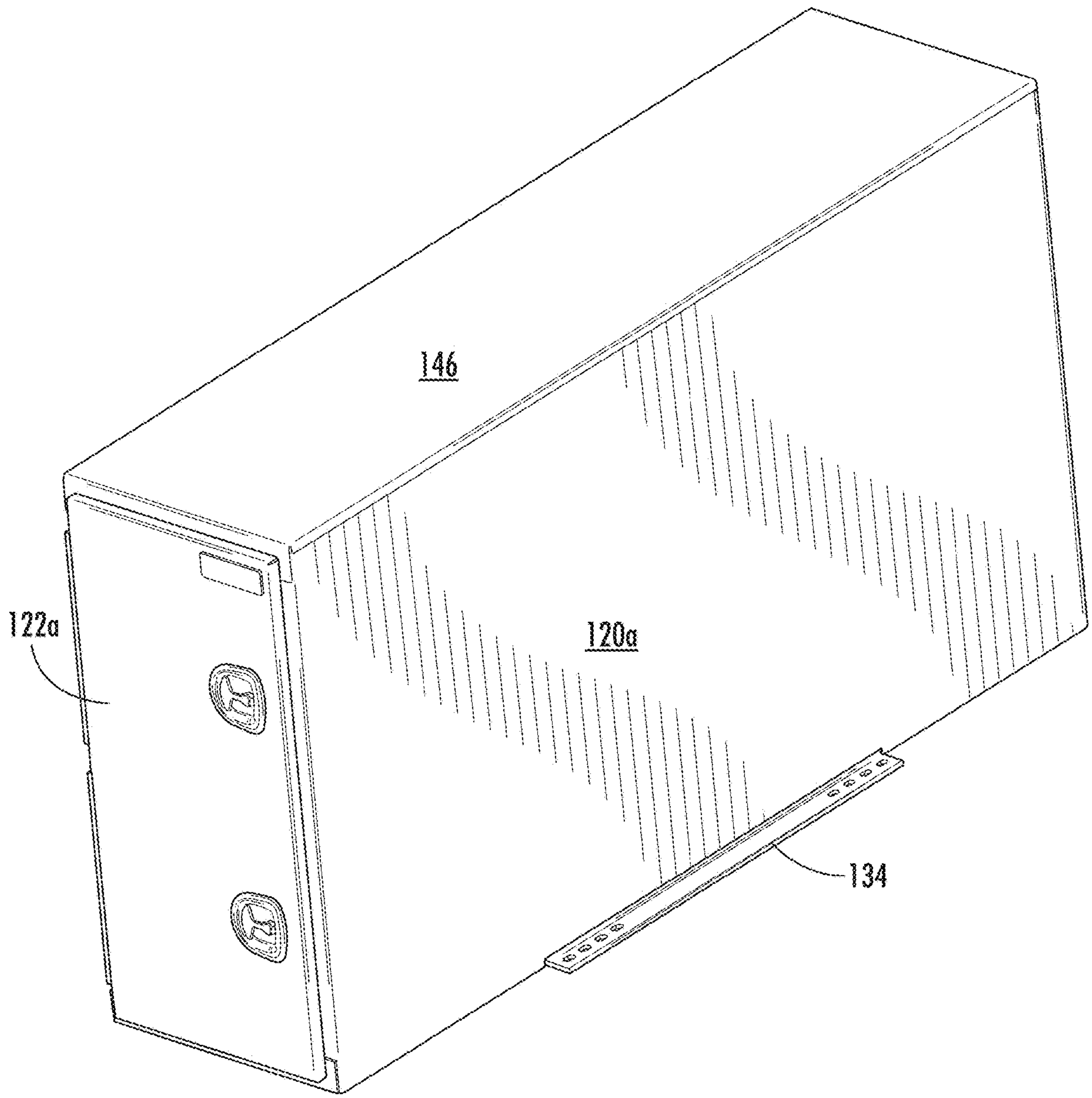
Figure 12B:
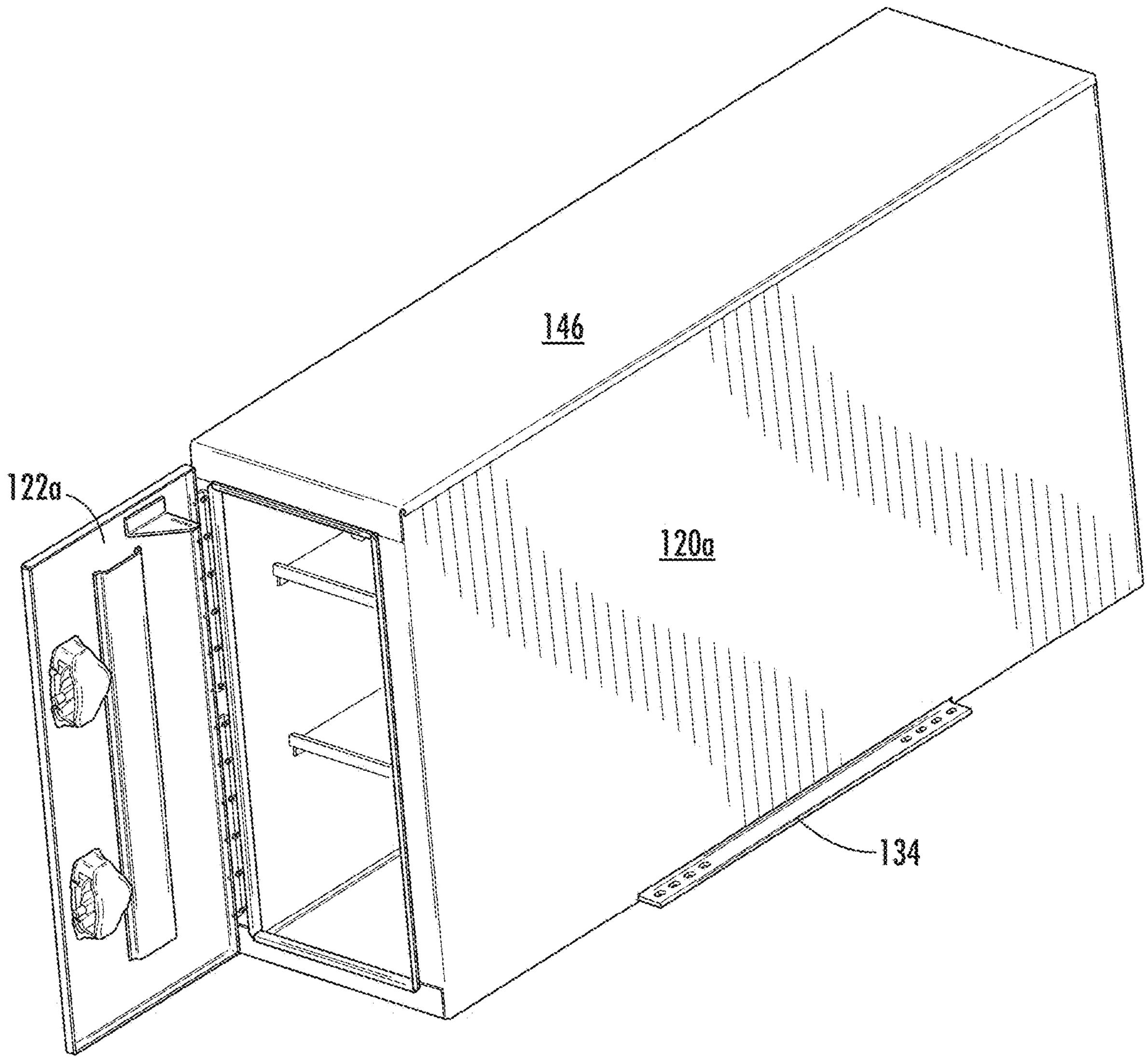

FIGS. 12A and 12B are perspective views showing the embodiment of the backpack truck box having a rectangular shape respectively with doors closed and open in accordance with the method of the present invention.

IV. DETAILED DESCRIPTION

Reference is now made to the drawings wherein the showings are for purposes of illustrating embodiments of the article only and not for purposes of limiting the same, and wherein like reference numerals are understood to refer to like components.

FIGS. 4A1, 4A2, 4B1, 4B2, 5A, 5B, 6A, 6B, 7 and 8 depict steps and interim product states in a method of fabricating a backpack truck box in accordance with the present invention. FIGS. 4A1, 4A2, 4B1 and 4B2 depict an initial interim product state of forming first and second patterned members 100*a*, 100*b* from sheet material, which can be sheet metal, stainless steel sheet (SST), carbon steel or alum. The patterned members 100*a*, 100*b* are pre-cut into a pattern which can be formed though a subsequent process into final panels, which are then assembled into the final backpack truck box, as will be described in detail hereinbelow. The patterned members 100*a*, 100*b* can be pre-cut using a metal saw or a laser in a computer numerical control (CNC) or by a stamping operation or other suitable operation without departing from the invention.

As also shown in FIGS. 4A1, 4A2, 4B1 and 4B2, each of the patterned members 100*a*, 100*b* are formed with a plurality of edges 110*sa*, 110*sb*, 110*pa*, 110*pb* having opposing tabs 112*sa*, 112*sb*, 112*pa*, 112*pb* formed contiguously on opposing edges of each of the first and second panels. In an exemplary embodiment of FIGS. 4A1 and 4B1, the step of forming the first and second patterned members 110*a*, 100*b* includes forming each panel 120*a*, 120*b* into a two-dimensional shape known from geometry as a “semi-truncated rectangle,” being of a generally rectangular shape but having two corners (e.g., the top-most comers) cut off or truncated. The pairs of the opposing tabs 112*sa*, 112*sb*, 112*pa*, 112*pb* are preferably rectangular in shape. Upon final assembly, these panels result in a backpack truck housing having a three-dimensional shape known from geometry as a “semi-truncated rectangular prism,” which is to say, a figure that extends linearly between the two panels 120*a*, 120*b* each having the shape of a semi-truncated rectangle. However, as shown in the alternate embodiment of FIGS. 4A2 and 4B2, these panels can also result in a solid rectangular shape, where it is appreciated that similar reference numerals refer to similar elements, in these figures and in the other figures throughout the present disclosure. It is to be further appreciated that the panels 120*a*, 120*b* could alternatively be formed from any other suitable shape without departing from the invention.

With continuing reference to FIGS. 4A1, 4A2, 4B1 and 4B2, the plurality of edges 110*sa*, 110*sb*, 110*pa*, 110*pb* of each panel 120*a*, 120*b* include first and second opposing parallel edges 110*pa*, 110*pb* and first and second opposing sloped edges 110*sa*, 110*sb*. The sloped edges 110*sa*, 110*sb* are formed along the edges of the truncated corners of the rectangle while the parallel edges 110*pa*, 110*pb* are formed along the remaining portions of the rectangular sides. The area bounded by these edges 110*sa*, 110*sb*, 110*pa*, 110*pb* and along with a top edge 114 and a bottom edge 116 defines the two-dimensional semi-truncated rectangular shape of each panel 120*a*, 120*b*, while the rectangular shaped panels are formed without sloped edges.

With ongoing reference to FIGS. 4A1, 4A2, 4B1 and 4B2, the pairs of rectangular opposing tabs 112*sa*, 112*sb*, 112*pa*, 112*pb* includes sloped edge tabs 112*sa*, 112*sb* formed respectively on opposing sloped edges 110*sa*, 110*sb* and parallel edge tabs 112*pa*, 112*pb* formed respectively on opposing parallel edges 112*pa*, 112*pb*. In the preferred embodiment, the pairs of rectangular opposing tabs 112*sa*, 112*sb*, 112*pa*, 112*pb* are mirror symmetrical with each other, as are the respective plurality of sloped and parallel edges 110*sa*, 110*sb*, 110*pa*, 110*pb* of each panel 120*a*, 120*b*.

With specific reference to FIGS. 4B1, 4B2, 5A, 5B, 6A, 6B, and 7, further steps of the present method include performing one or more bending operations upon each of the pairs of opposing tabs 112*sa*, 112*sb*, 112*pa*, 112*pb* to form first and second side portions 130*sa*, 130*sb*, 130*pa*, 130*pb* extending at a predetermined angle from each of the first and second panels 120*a*, 120*b*. The side portions 130*sa*, 130*sb*, 130*pa*, 130*pb* are generally flat portions that extend along the entire length of each of the respective edges 110*sa*, 110*sb*, 110*pa*, 110*pb*. The side portions 130*sa*, 130*sb*, 130*pa*, 130*pb* are defined by wider portions of the opposing tabs 112*sa*, 112*sb*, 112*pa*, 112*pb*, as explained hereinbelow. The steps of performing the bending operations includes forming the side portions 130*pa*, 130*pb* respectively along the first and second opposing parallel edges 110*pa*, 110*pb* and also forming the side portions 130*sa*, 130*sb* along the first and second opposing sloped edges 110*sa*, 110*sb*.

In one exemplary embodiment, the bending operations can be performed by forming dies or on a traditional press brake. However, it is to be appreciated that the bending operations can alternatively be formed by any other suitable device or process.

With continued reference to FIGS. 4B1, 4B2, 5A, 5B, 6A, 6B, and 7, the steps of performing the bending operations includes performing the bending operations upon each of the pairs of opposing tabs 112*sa*, 112*sb*, 112*pa*, 112*pb* to form perpendicular side portions 130*sa*, 130*sb*, 130*pa*, 130*pb* formed at right angles to the panels 120*a*, 120*b*. In this manner, the perpendicular side portions 130*sa*, 130*sb*, 130*pa*, 130*pb* each define a partial perimeter into an internal volume of the backpack truck box housing upon final assembly. An additional plurality of bending operations are also performed to produce perpendicularly-extending rectangular gutters 132*sa*, 132*sb*, 132*pa*, 132*pb*, formed at right angles to the to the side portions 130*sa*, 130*sb*, 130*pa*, 130*pb* and extending outwardly away therefrom. The gutters 132*sa*, 132*sb*, 132*pa*, 132*pb* are formed from portions of the opposing tabs 112*sa*, 112*sb*, 112*pa*, 112*pb* that are narrower than the side portions 130*sa*, 130*sb*, 130*pa*, 130*pb*, so that the partial perimeters resulting from each of the gutters 132*sa*, 132*sb*, 132*pa*, 132*pb* have a smaller extent than the side portions 130*sa*, 130*sb*, 130*pa*, 130*pb*. However, it is further contemplated that the gutters could be optionally substituted with a section of gasket material, without departing from the invention.

With additional reference to FIGS. 4B1, 4B2, 5A, 5B, 6A, 6B, and 7, the gutters 132*sa*, 132*sb*, 132*pa*, 132*pb* can be formed by creating a perpendicular bend along a boundary portion where the gutters 132*sa*, 132*sb*, 132*pa*, 132*pb* adjoin the 130*sa*, 130*sb*, 130*pa*, 130*pb*, and another perpendicular bend formed along the middle of the narrow portions of the opposing tabs 112*sa*, 112*sb*, 112*pa*, 112*pb*. The resulting structure of the gutters 132*sa*, 132*sb*, 132*pa*, 132*pb* are oriented so that an outer edge is angled in a direction back toward the respective outer surfaces of the first and second panels 120*a*, 120*b*. In this manner, the gutters 132*sa*, 132*sb*, 132*pa*, 132*pb* define the partial perimeters that will form the openings into the interior of the backpack truck box.

As specifically indicated in FIGS. 4A1, 4A2, 4B1 and 4B2 the bottom edge 116 of the panels 120*a*, 120*b* can be formed with a ledge 134 to provide a mounting surface. This ledge 134 can be formed in the pattern and bending operations described hereinabove. However, in an alternative embodiment, as shown in FIG. 5, the bottom edge 116 can be notched during the pattern operation to omit this ledge 134.

As specifically indicated in FIGS. 4B1, 4B2, and 8, the method further includes steps of welding together the side portions 130*sa*, 130*sb*, 130*pa*, 130*pb* of the first panel 120*a* to respective corresponding side portions 130*sa*, 130*sb*, 130*pa*, 130*pb* of the second panel 120*b* to produce a welded backpack truck box housing 140. Specifically, the welding steps include welding a middle portion 142 between the side portions 130*sa*, 130*sb*, 130*pa*, 130*pb* to define a width of the backpack truck box housing. As indicated in FIG. 8, the middle portion 142 can also include a middle gutter 144 for also defining a partial perimeter contiguous with the partial perimeters formed by the gutters 132*sa*, 132*sb*, 132*pa*, 132*pb*.

As also shown in FIG. 8, the principal welds can be formed between the middle portion 142 and along the joint between the sloped side portions 130*sa*, 130*sb* and the parallel side portions 130*pa*, 130*pb*. However, the middle portion 142 can be omitted in embodiments with only one door. With the present method, it is no longer necessary to perform welds along the sloped and parallel edges of each panel 20*a*, 20*b* as was done in the prior art. Thus, the present method considerably reduces the number of welds in the finished backpack truck box 140, greatly reducing manufacturing time and resources and the resulting costs, while also providing a smoother, more uniform and regular aesthetic appearance to the finished product.

Figure 1A:
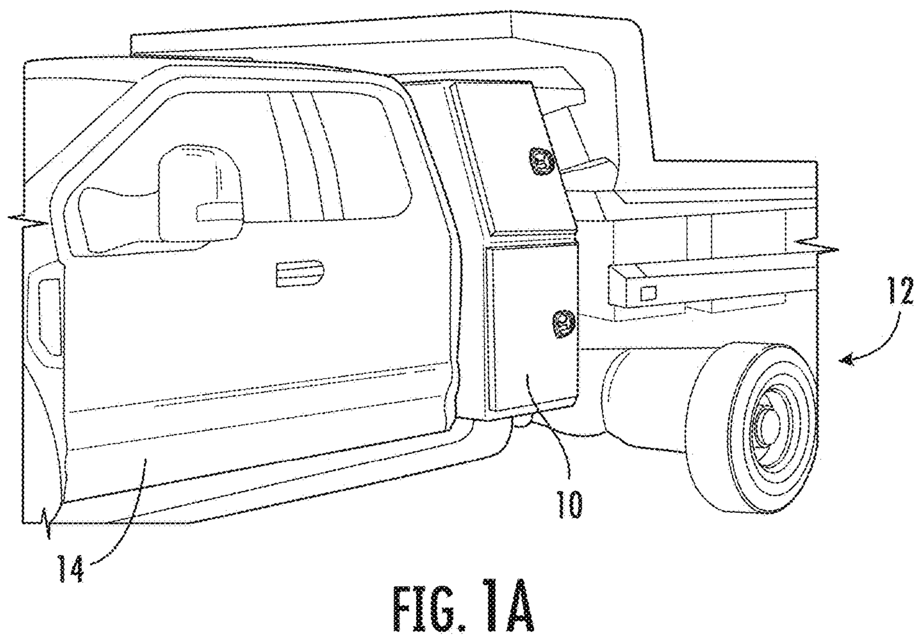
Figure 1B:
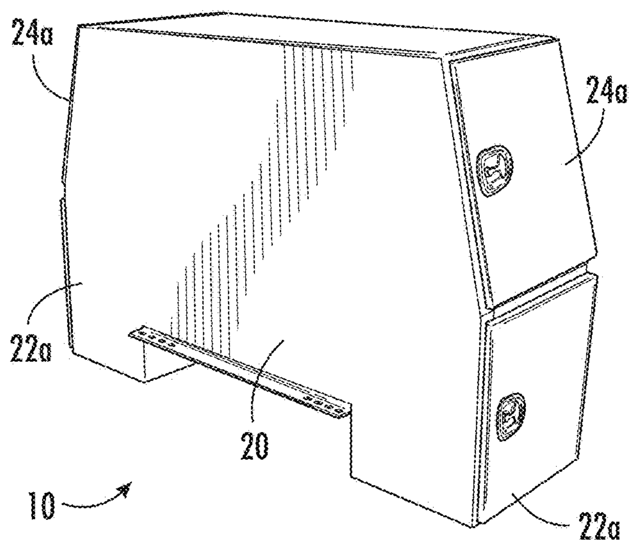
Figure 1C:
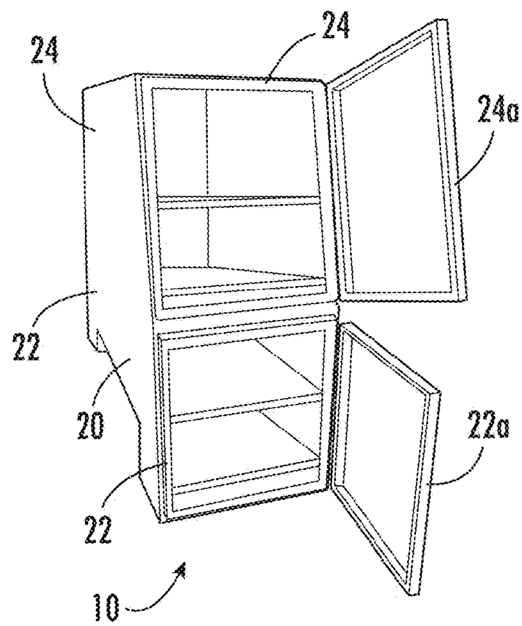
Figure 2:
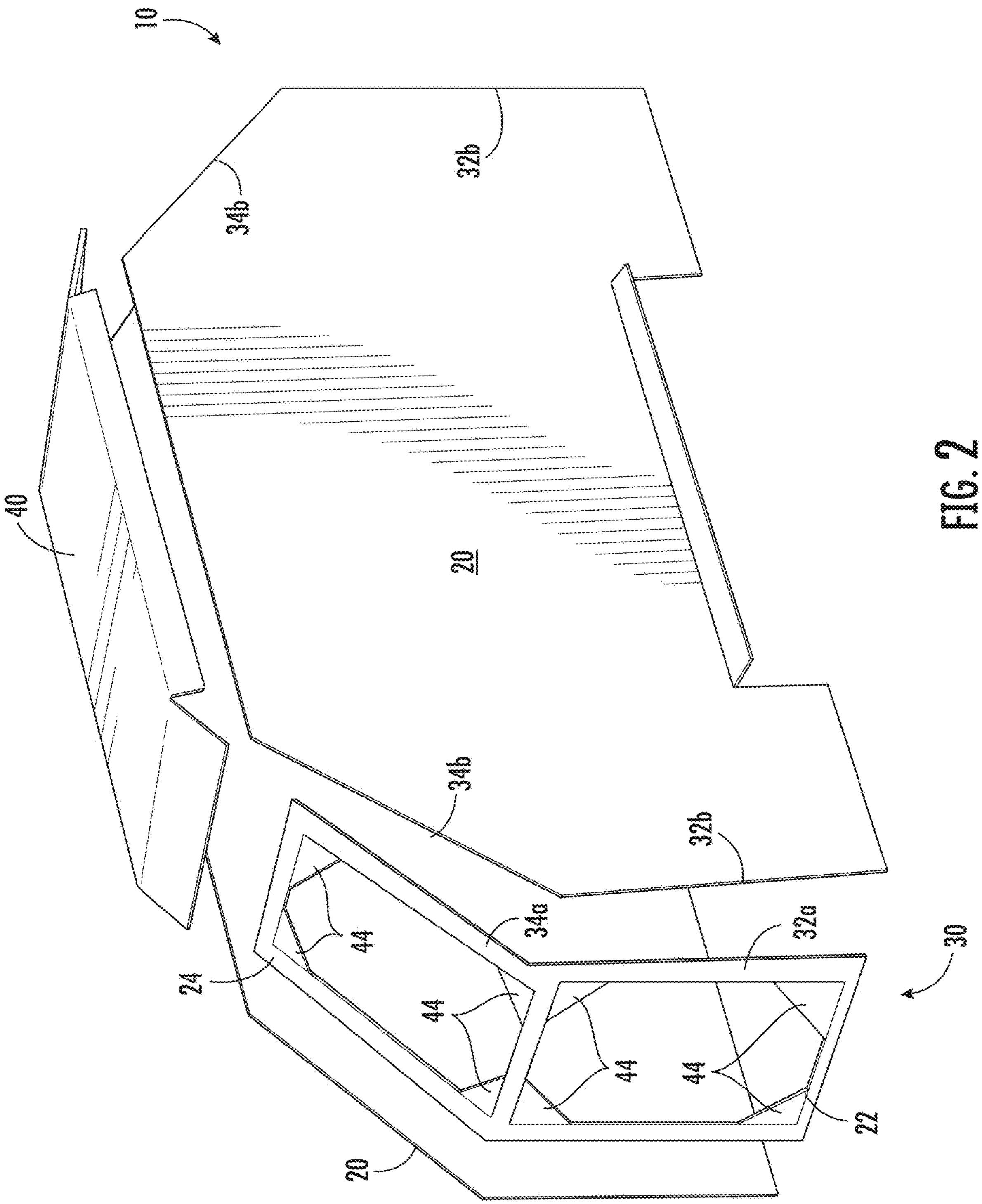
FIG. 2 is an exploded view showing a backpack truck box as formed in accordance with a known method.
Figure 3:
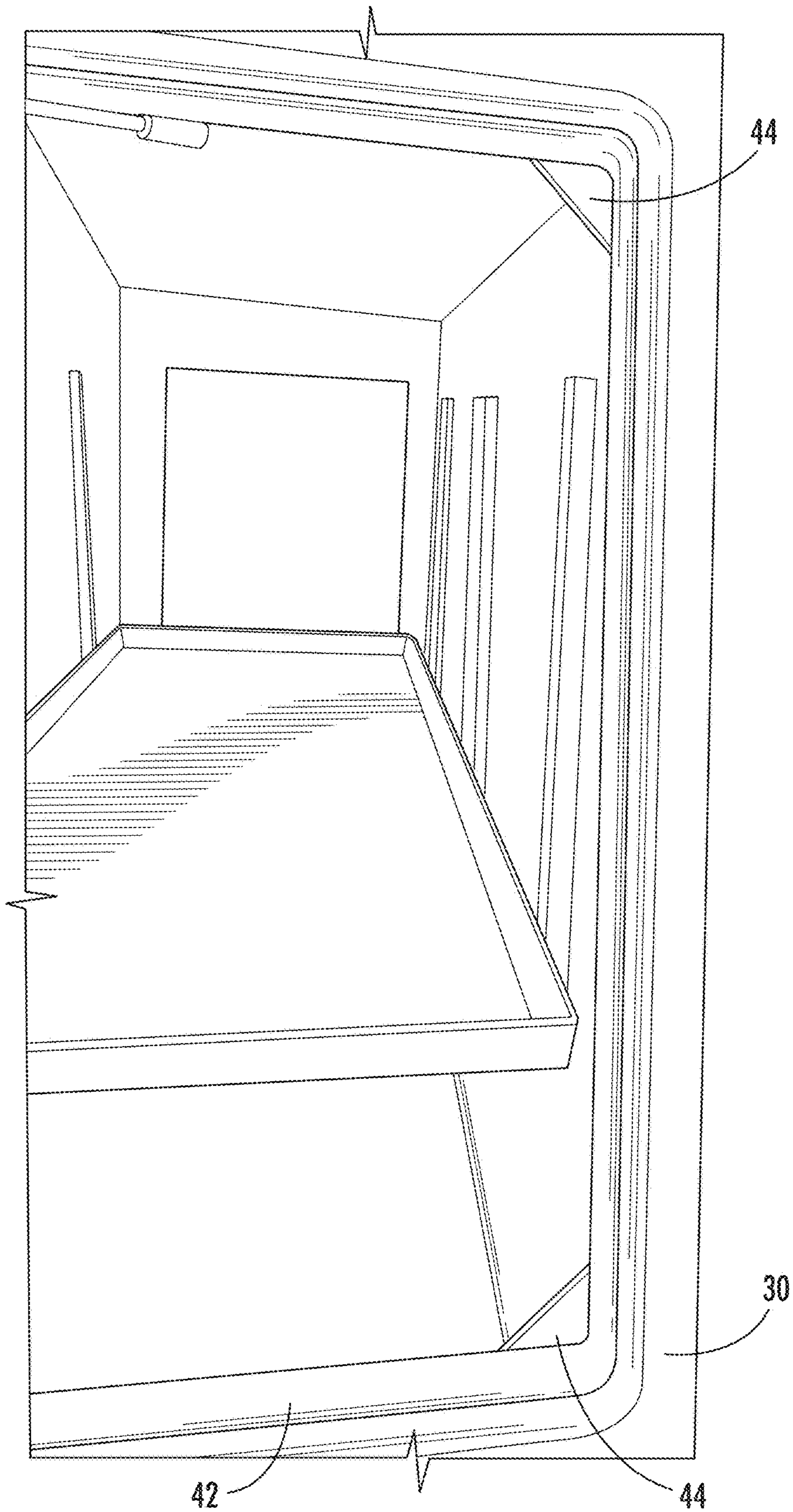
FIG. 3 is a side view looking into an opening of a truck box including gussets as formed in accordance with a known method.

As also shown in FIGS. 4B1 and 4B2, a top portion 146 is welded onto the panels 120*a*, 120*b* of the assembled backpack truck box housing to provide an enclosure to a top surface of the backpack truck box 140. The bottom edge of the top portion 144 cooperates with the gutters 132*sa*, 132*sb*, 132*pa*, 132*pb*, 144 to define a continuous perimeter for openings 150 into the internal volume of the backpack truck box 140. Shelves 152 are optionally assembled or welded within the interior volume of the backpack truck box housing 140 Doors can then be attached to each of the partial perimeters formed by the gutters 132*sa*, 132*sb*, 132*pa*, 132*pb*, 144 for enclosing the internal volume of the backpack truck box housing 140.

FIGS. 9A, 9B, 9C, 9D, 9E, and 9F show various views of all sides of the semi-truncated embodiment of the assembled backpack truck box 140 formed in accordance with the method of the present invention. FIGS. 11A, 11B, 11C, 11D, 11E, and 11F similar depict the rectangular embodiment. These views respectively show the first and second panels 120*a*, 120*b* the side portions 130*sa*, 130*sb*, 130*pa*, 130*pb*, with the middle portion 142 with the top portion 146 and all the openings 150 formed therefrom. It is to be appreciated that the backpack truck box 140 as shown and described herewith is mirror symmetrical and any features not explicitly shown by any reference numerals in any of the views should be understood to identically correspond to mirror symmetrical features that are explicitly shown, as would be understood by those having skill in the art.

FIGS. 10A and 10B respectively show a completed backpack truck box of the "semi-truncated rectangular prism" embodiment, configured to receive doors 122*a*, 124*a* that allow access to the interior compartments of the truck box. FIGS. 12A and 12B respectively show a backpack truck box of the rectangular box embodiment, also configured to receive doors 122*a*, 124*a* that allow access to the interior compartments of the truck box.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. A method of fabricating a backpack truck box, comprising:

forming first and second patterned members from sheet material, wherein each of the patterned members comprises a plurality of edges defining a first panel and a second panel each with at least a pair of opposing tabs formed contiguously on opposing edges of each of the first and second panels;

performing at least one bending operation upon each of the at least a pair of opposing tabs to form first and second side portions extending at a predetermined angle from each of the first and second panels; and welding together the side portions of the first panel to respective corresponding side portions of the second panel to produce a welded backpack truck box housing.

2. The method of claim 1, wherein the forming of the first and second patterned members comprises forming each panel into a two-dimensional shape of a semi-truncated rectangle with at least a pair of rectangular opposing tabs, resulting in a backpack truck box housing having a three-dimensional shape of a semi-truncated rectangular prism.

3. The method of claim 2, wherein the plurality of edges of each panel comprise first and second opposing parallel edges and first and second opposing sloped edges, and wherein the at least a pair of rectangular opposing tabs comprise tabs formed respectively on each of the respective opposing parallel and sloped edges, wherein the step of performing the at least one bending operation comprises forming side portions along each of the first and second opposing parallel edges and first and second opposing sloped edges.

4. The method of claim 1, wherein the performing of at least one bending operation comprises performing a plurality of bending operations upon each of the at least a pair of opposing tabs to form perpendicular side portions each having perpendicularly-extending rectangular gutters that each define a partial perimeter into an internal volume of the backpack truck box housing.

5. The method of claim 4, further comprising attaching a door to at least one partial perimeter for enclosing the internal volume of the backpack truck box housing.

6. The method of claim 1, wherein the welding together of the side portions of the panels further comprises welding a middle portion between the side portions to define a width of the backpack truck box housing.

7. The method of claim 1, further comprising welding a top portion onto the backpack truck box housing.

8. The method of claim 1, further comprising assembling at least one shelf within the backpack truck box housing.

9. A method of fabricating a backpack truck box, comprising:

forming first and second patterned members from sheet material, wherein each of the patterned members comprises first and second opposing parallel edges and first and second opposing sloped edges thereby defining a first panel and a second panel each having a two-dimensional shape of a semi-truncated rectangle and having rectangular tabs formed respectively contiguously on the respective opposing parallel and sloped edges of each of the first and second panels;

performing at least one bending operation upon each of the rectangular tabs to form parallel and sloped side portions extending perpendicularly from each of the first and second panels respectively along each of the first and second opposing parallel and sloped edges;

welding a middle portion between the parallel and sloped side portions of the first panel to respective parallel and sloped side portions of the second panel to produce a welded backpack truck box housing; and welding a top portion onto the backpack truck box housing.

10. The method of claim 9, wherein the performing of at least one bending operation comprises performing a plurality of bending operations upon each of the at least a pair of opposing tabs to form perpendicular side portions each having perpendicularly-extending rectangular gutters that each define a partial perimeter into an internal volume of the backpack truck box housing.

11. The method of claim 10, further comprising attaching a door to at least one partial perimeter for enclosing the internal volume of the backpack truck box housing.

* * * * *